United States Patent
Tsuji et al.

(10) Patent No.: US 12,315,174 B2
(45) Date of Patent: May 27, 2025

(54) IMAGE PROCESSING DEVICE, IMAGE PROCESSING METHOD, AND PROGRAM

(71) Applicant: OMRON Corporation, Kyoto (JP)

(72) Inventors: Ayana Tsuji, Kyoto (JP); Takashi Ohta, Kyoto (JP); Tsuyoshi Kobayashi, Kyoto (JP); Toshifumi Kishida, Kyoto (JP)

(73) Assignee: OMRON Corporation, Kyoto (JP)

( * ) Notice: Subject to any disclaimer, the term of this patent is extended or adjusted under 35 U.S.C. 154(b) by 361 days.

(21) Appl. No.: 17/908,039

(22) PCT Filed: Dec. 16, 2020

(86) PCT No.: PCT/JP2020/047021
§ 371 (c)(1),
(2) Date: Aug. 30, 2022

(87) PCT Pub. No.: WO2021/181790
PCT Pub. Date: Sep. 16, 2021

(65) Prior Publication Data
US 2023/0082044 A1 Mar. 16, 2023

(30) Foreign Application Priority Data
Mar. 12, 2020 (JP) .................... 2020-042659

(51) Int. Cl.
*G06T 7/20* (2017.01)
*G06T 7/254* (2017.01)
(Continued)

(52) U.S. Cl.
CPC ............ *G06T 7/254* (2017.01); *G06V 10/751* (2022.01); *G06V 10/761* (2022.01)

(58) Field of Classification Search
CPC .......... G06T 7/254; G06T 2207/20021; G06T 2207/30196; G06T 2207/30232;
(Continued)

(56) References Cited

U.S. PATENT DOCUMENTS

2015/0139504 A1 5/2015 Kurosawa et al.
2016/0078286 A1 3/2016 Tani et al.
(Continued)

FOREIGN PATENT DOCUMENTS

JP 2002352352 A 12/2002
JP 2015100031 A 5/2015
(Continued)

OTHER PUBLICATIONS

Machine translation for WO 2018/207691 (Year: 2018).*
International Search Report issued in Intl. Appln. No. PCT/JP2020/047021 mailed Feb. 2, 2021. English translation provided.
Written Opinion issued in Intl. Appln. No. PCT/JP2020/047021 mailed Feb. 2, 2021. English translation provided.

*Primary Examiner* — Qian Yang
(74) *Attorney, Agent, or Firm* — METROLEX IP LAW GROUP, PLLC; Robert L. Scott, Esq.

(57) ABSTRACT

An image processing apparatus includes an image obtainer that obtains captured images captured with a camera in a time series, an accumulator that accumulates movement information about a moving object in the captured images in the time series, a calculator that calculates movement information about the moving object based on the captured images in the time series obtained by the image obtainer, a comparator that compares the movement information about the moving object calculated by the calculator with the movement information about the moving object accumulated by the accumulator, a determiner that determines, based on a result of comparison of the movement information about the moving object performed by the comparator, whether the moving object being a target for the comparison performed by the comparator shows abnormal movement, (Continued)

and an output unit that outputs a result of determination performed by the determiner.

6 Claims, 7 Drawing Sheets

(51) Int. Cl.
    *G06V 10/74*     (2022.01)
    *G06V 10/75*     (2022.01)

(58) Field of Classification Search
    CPC ............... G06V 10/751; G06V 10/761; G08B 13/19613; H04N 7/183
    See application file for complete search history.

(56) References Cited

U.S. PATENT DOCUMENTS

| | | |
|---|---|---|
| 2017/0148178 A1 | 5/2017 | Oami et al. |
| 2019/0197708 A1 | 6/2019 | Oami et al. |
| 2019/0206067 A1 | 7/2019 | Oami et al. |
| 2021/0104053 A1 | 4/2021 | Oami et al. |

FOREIGN PATENT DOCUMENTS

| | | | |
|---|---|---|---|
| WO | | 2014174738 A1 | 10/2014 |
| WO | | 2016002408 A1 | 1/2016 |
| WO | WO 2018/207691 | * | 11/2018 |

* cited by examiner

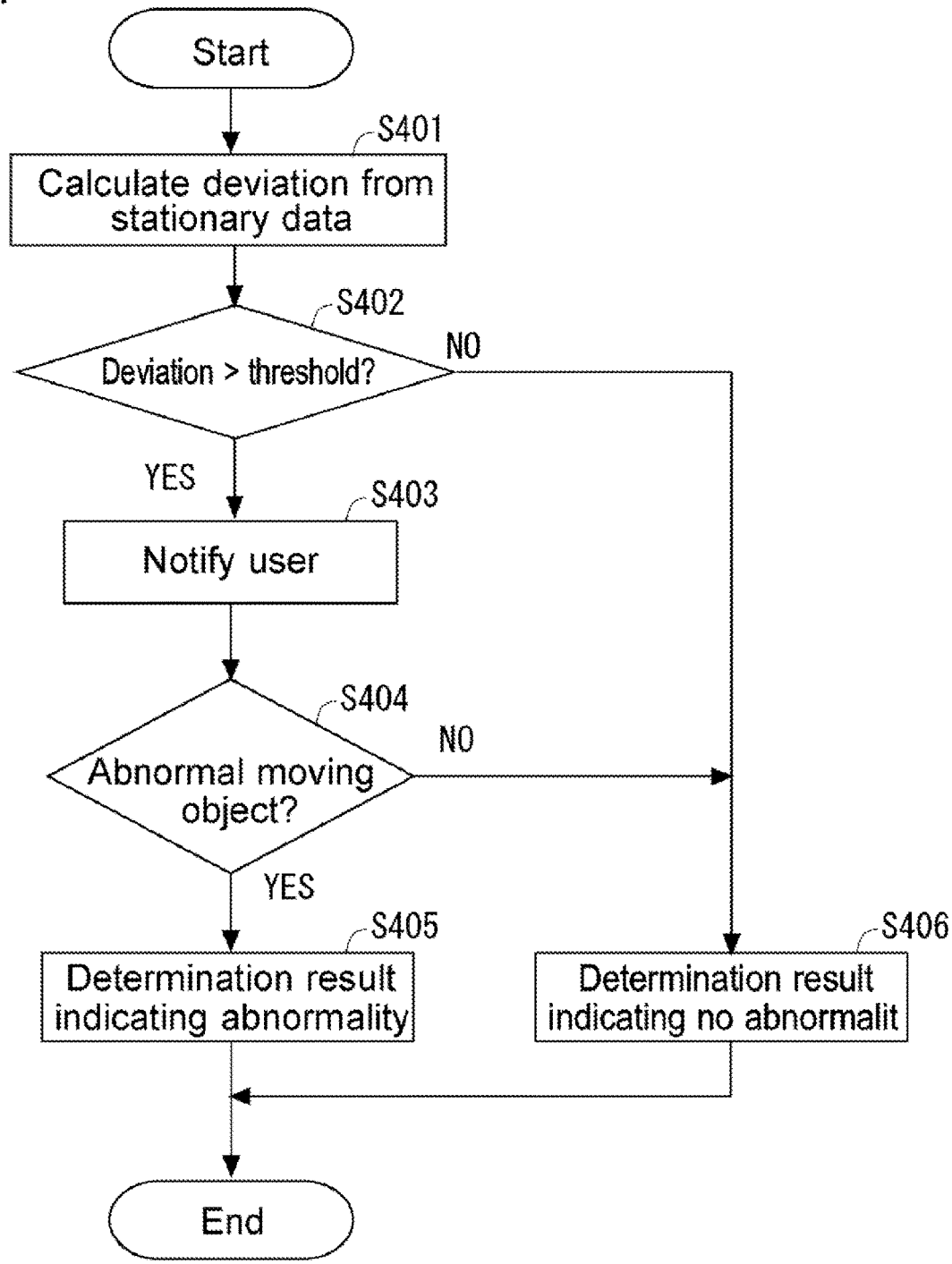

| 98 | 91 | 99 | 95 | 94 | 90 | 91 | 98 | 99 | 97 | 94 |
|---|---|---|---|---|---|---|---|---|---|---|
| 91 | 89 | 93 | 94 | 95 | 95 | 98 | 99 | 97 | 95 | 91 |
| 70 | 66 | 68 | 72 | 71 | 65 | 67 | 68 | 70 | 66 | 69 |
| 65 | 63 | 62 | 61 | 68 | 65 | 67 | 63 | 63 | 61 | 64 |
| 11 | 8.3 | 11 | 8.9 | 21 | 46 | 47 | 23 | 13 | 5.8 | 6.2 |
| 11 | 9.8 | 13 | 8.9 | 14 | 50 | 40 | 7 | 11 | 5.8 | 13 |
| 3.1 | 4 | 2.1 | 1.7 | 44 | 46 | 49 | 2.7 | 4.5 | 6.7 | 5.4 |
| 1.3 | 1.4 | 1.1 | 1.5 | 48 | 45 | 44 | 1.2 | 1.4 | 1.4 | 1.1 |
| 1.8 | 1.9 | 1.5 | 1.7 | 49 | 40 | 48 | 1.7 | 1.8 | 1.1 | 0.9 |
| 1.3 | 0.6 | 0.7 | 1.4 | 43 | 48 | 48 | 25 | 5.9 | 11 | 8.6 |
| 1.1 | 0.9 | 0.7 | 1.2 | 6.5 | 11 | 15 | 48 | 1.7 | 1.5 | 0.7 |

FIG.5C

Time t-1

Time t

Time t+1

FIG.6D

| 0.8 | 1.3 | 1.2 | 1   | 0.9 | 0.7 | 0.9 | 0.1 | 0.8 | 1.4 | 0.8 |
|-----|-----|-----|-----|-----|-----|-----|-----|-----|-----|-----|
| 0.7 | 1.3 | 1.1 | 0.8 | 0.9 | 0.9 | 1.2 | 1.4 | 1.1 | 1.1 | 1.3 |
| 0.7 | 1.3 | 0.5 | 1.2 | 1.2 | 0.8 | 0.8 | 1.4 | 1.2 | 0.9 | 1.3 |
| 1.1 | 1.4 | 0.8 | 0.9 | 1.1 | 1.3 | 1.2 | 0.9 | 0.8 | 0.7 | 1.1 |
| 1.5 | 1.2 | 1.1 | 0.8 | 0.7 | 0.8 | 1.1 | 1.2 | 0.8 | 0.8 | 1.1 |
| 1.4 | 0.8 | 1.4 | 1.3 | 1.2 | 1   | 0.8 | 0.7 | 1.1 | 1.3 | 1.2 |
| 1.3 | 1.2 | 1.5 | 0.9 | 9.4 | 9   | 0.9 | 0.7 | 1.1 | 1.4 | 1   |
| 0.5 | 1.1 | 4.8 | 4.4 | 9.6 | 9.7 | 1.1 | 0.8 | 1.5 | 1.1 | 1.1 |
| 0.6 | 9.7 | 9.7 | 6.4 | 9.6 | 9.1 | 1   | 1.5 | 0.9 | 1.3 | 0.7 |
| 1   | 9.3 | 9.6 | 5.2 | 1.5 | 1.4 | 0.5 | 0.7 | 0.8 | 1.1 | 0.8 |
| 1.2 | 1.3 | 0.5 | 0.7 | 1.4 | 1.3 | 0.6 | 1.3 | 0.8 | 0.9 | 1.2 |

IMAGE PROCESSING DEVICE, IMAGE PROCESSING METHOD, AND PROGRAM

FIELD

The present invention relates to a technique for detecting abnormal movement of a moving object in an image captured with a camera.

BACKGROUND

In monitoring using network cameras (Internet Protocol or IP cameras), moving objects showing abnormal movement are to be detected based on images captured with network cameras installed in buildings to notify users, for example, administrators, of such objects with abnormal movement.

Techniques have been developed for automatically determining moving objects that show abnormal movement. Patent Literature 1 describes a technique for calculating motion vectors between frames of a video captured with a camera and providing notification about a moving object showing abnormal movement when any motion vector representing abnormal movement predefined for each block of an image is detected. Patent Literature 2 describes a technique for determining abnormal behavior of a person to be observed by storing parameters associated with daily activities of the person using a camera in a database and comparing parameters associated with the occurrence of such daily activities estimated using a motion sensor or an image sensor with the parameters stored in the database.

CITATION LIST

Patent Literature

Patent Literature 1: Japanese Unexamined Patent Application Publication No. 2015-100031
Patent Literature 2: Japanese Unexamined Patent Application Publication No. 2002-352352

SUMMARY

Technical Problem

However, the known technique uses data such as vectors and parameters for predefining abnormal movement and abnormal behavior in accordance with various situations including the use of the network camera. To accurately detect abnormal movement of moving objects in various situations using known techniques, various sets of data are to be generated and used. This may greatly increase the processing load associated with image processing and determination processing for the video with the network camera.

In response to the above issue, one or more aspects of the present invention are directed to a technique for detecting abnormal movement of a moving object in an image while reducing the load of image processing on the image captured with a camera.

Solution To Problem

The technique according to one or more aspects of the present invention has the structure described below.

An image processing apparatus according to a first aspect of the present invention includes an image obtainer that obtains captured images captured with a camera in a time series, an accumulator that accumulates movement information about a moving object in the captured images in the time series, a calculator that calculates movement information about the moving object based on the captured images in the time series obtained by the image obtainer, a comparator that compares the movement information about the moving object calculated by the calculator with the movement information about the moving object accumulated by the accumulator, a determiner that determines, based on a result of comparison of the movement information about the moving object performed by the comparator, whether the moving object being a target for the comparison performed by the comparator shows abnormal movement, and an output unit that outputs a result of determination performed by the determiner. This allows detection of moving objects showing abnormal movement with less load on image processing because various sets of data are not prepared in advance or such sets of data are not used for comparison with movement information obtained from captured images.

The movement information may include at least one of a movement amount of the moving object or a movement direction of the moving object. This allows, for example, detection of movement of the moving object into an area that is not normally to be entered based on the movement amount of the moving object, detection of movement of the moving object in an unusual direction based on the movement direction of the moving object, and detection of the moving object showing unusual behavior such as prowling based on the movement amount and the movement direction of the moving object.

The calculator may calculate the at least one of the movement amount or the movement direction based on a difference in pixel value between captured images obtained in the time series by the image obtainer. This allows the movement amount and the movement direction of the moving object to be calculated based on a difference in pixel value between the captured images of two adjacent frames, or based on an average of the differences in pixel value between the captured images of three or more adjacent frames.

For the movement information including the movement amount of the moving object, the accumulator may accumulate a range determined by one of an average, a mode, a median, a minimum, or a maximum of the movement amount. This allows flexible selection of a criteria used in comparison with the movement amount calculated based on the captured images to detect moving objects showing abnormal movement as appropriate for the environment in which the camera captures images.

The above image processing apparatus may further include a receiver that receives a user input for the result of determination output by the output unit. The user input may indicate whether the moving object shows the abnormal movement. The accumulator may determine, in accordance with the user input received by the receiver, whether to update the movement information accumulated by the accumulator using the movement information calculated by the calculator. This structure improves the detection accuracy of moving objects showing abnormal movement in subsequent detection by updating the accumulated movement information based on feedback using the user input when the moving object showing normal movement is determined to show abnormal movement by the image processing apparatus.

Other aspects of the present invention may be directed to an image processing method including at least part of the above processes, a program for causing a computer to implement the method, or a non-transitory computer-readable storage medium storing the program. The above structure and processes may be combined with one another unless any technical contradiction arises.

Advantageous Effects

The structure according to the above aspects of the present invention can detect moving objects showing abnormal movement with less processing load on images obtained with a camera.

BRIEF DESCRIPTION OF THE DRAWINGS

FIG. 4 is a flowchart of an example process of a subroutine performed by the PC according to the embodiment.

FIG. 5A is a schematic diagram of a captured image in a specific example of the embodiment, and FIGS. 5B and 5C are schematic diagrams of stationary data indicating a movement amount and stationary data indicating a movement direction in a specific example.

FIGS. 6D and 6E are schematic diagrams describing the movement amount and the movement direction calculated based on the captured images shown in FIGS. 6A to 6C.

DETAILED DESCRIPTION

Example Use

An example use of the present invention will now be described. In monitoring using network cameras (Internet Protocol or IP cameras), moving objects showing abnormal movement are to be detected based on images captured with network cameras installed in buildings to notify users, for example, administrators, of such objects with abnormal movement. However, to maintain the detection accuracy of a moving object showing abnormal movement in various use environments with a known technique, the load on the image processing may increase due to a large dictionary used to detect the moving object from captured images.

Figure 1:
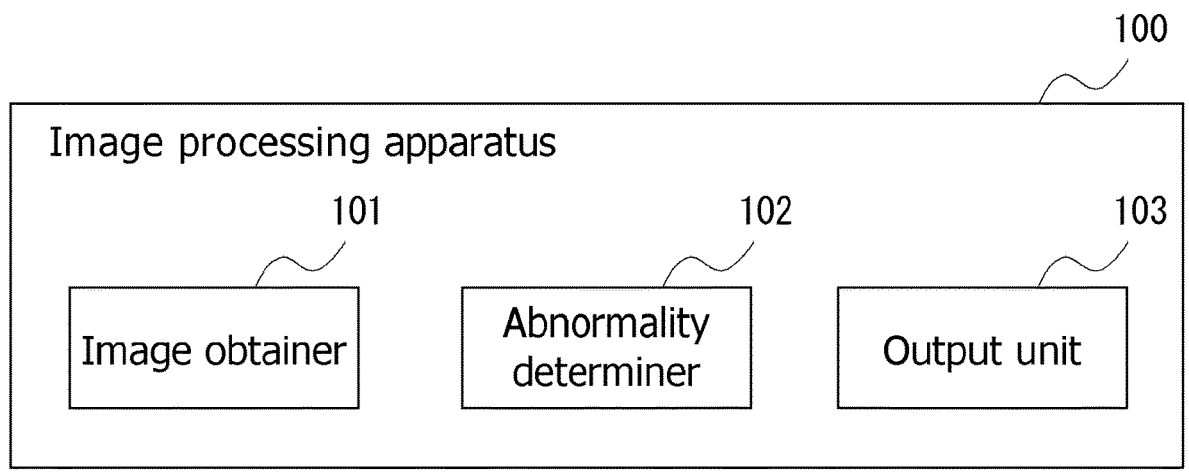
FIG. 1 is a block diagram of an image processing apparatus according to one or more embodiments of the present invention.

FIG. 1 is a block diagram of an image processing apparatus 100 according to an embodiment of the present invention. The image processing apparatus 100 includes an image obtainer 101, an abnormality determiner 102, and an output unit 103. The image obtainer 101 obtains an image captured with a network camera. The abnormality determiner 102 performs a process described in detail in the embodiment below to detect a moving object showing abnormal movement in the captured image. More specifically, the abnormality determiner 102 calculates a movement amount and a movement direction of a moving object based on the captured image, and identifies the moving object showing abnormal movement based on the calculated movement amount and movement direction. The output unit 103 outputs a notification about the moving object showing abnormal movement identified by the abnormality determiner 102.

In the image processing apparatus 100 according to an embodiment of the present invention, the moving object showing abnormal movement in the image captured with the camera can be accurately detected while the load on the image processing is reduced in various use environments.

Description of Embodiment

Figure 2:
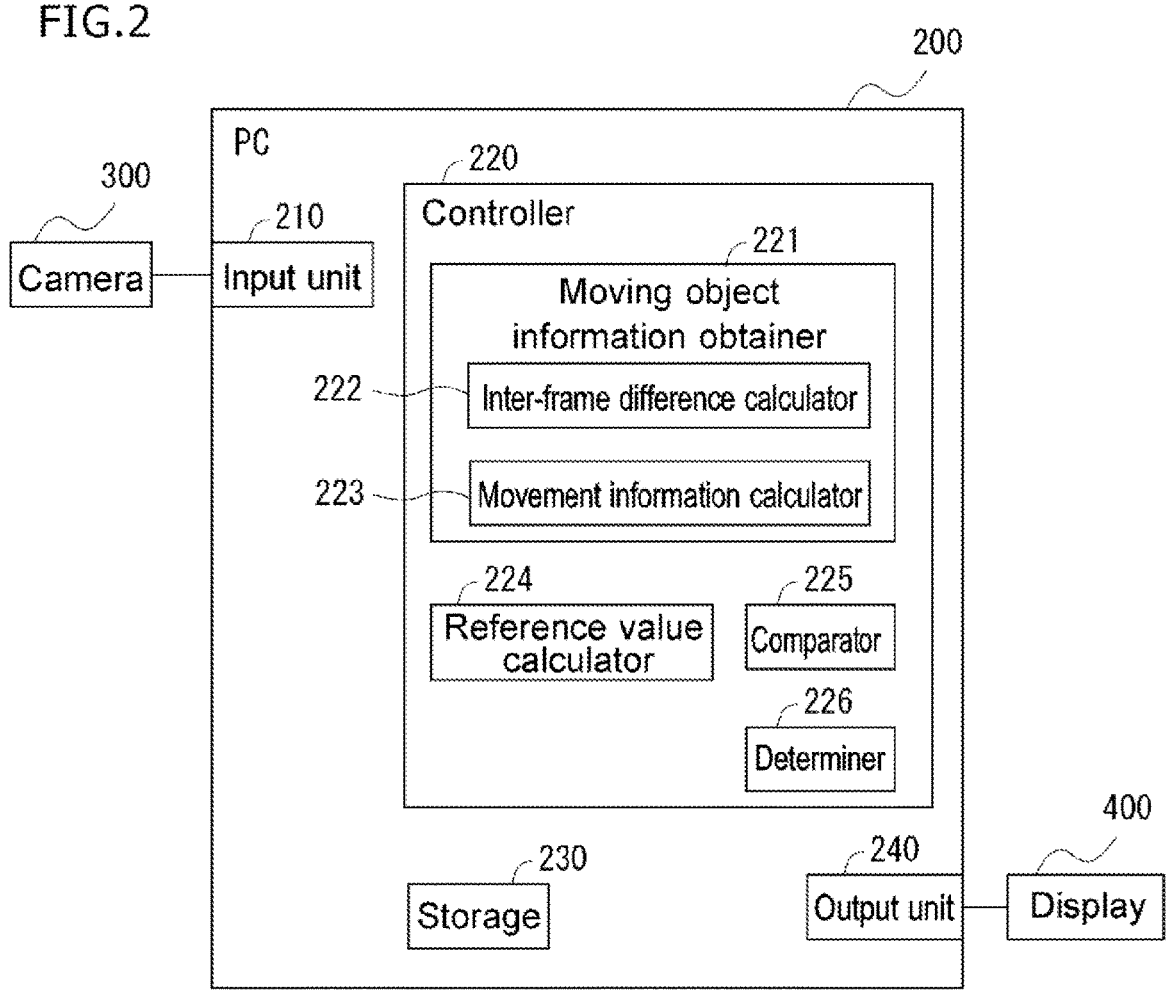
FIG. 2 is a block diagram of a personal computer or a PC (image processing apparatus) according to an embodiment.

An embodiment of the present invention will now be described. FIG. 2 is a schematic diagram of an image processing system in the present embodiment showing its example configuration. The image processing system in the present embodiment includes a personal computer or a PC 200 (image processing apparatus), a network camera 300, and a display 400. The PC 200 and the network camera 300 are connected to each other with a wire or wirelessly. The PC 200 and the display 400 are connected to each other with a wire or wirelessly.

In the present embodiment, for example, the network camera 300 installed under eaves of an entrance of a house captures images of the entrance, premises of the house, and a road adjacent to the premises. The network camera 300 obtains multiple frames of captured images and outputs the obtained images to the PC 200. The PC 200 identifies a moving object showing abnormal movement based on the images captured with the network camera 300, and outputs information about the identified moving object to the display. Examples of the display include a display device and an information processing terminal (e.g., a smartphone).

In the present embodiment, the PC 200 is a device separate from the network camera 300 and the display 400. In some embodiments, the PC 200 may be integral with the network camera 300 or the display 400. The PC 200 may be installed at any location. For example, the PC 200 may be installed at the same location as the network camera 300. In some embodiments, the PC 200 may be a cloud computer.

The PC 200 includes an input unit 210, a controller 220, a storage 230, and an output unit 240. The controller 220 includes a moving object information obtainer 221, a reference value calculator 224, a comparator 225, and a determiner 226. The moving object information obtainer 221 includes an inter-frame difference calculator 222 and a movement information calculator 223. The input unit 210, the storage 230, the inter-frame difference calculator 222, the comparator 225, the determiner 226, and the output unit 240 correspond to an image obtainer, an accumulator, a calculator, a comparator, a determiner, and an output unit in an aspect of the present invention.

The input unit 210 obtains, from the network camera 300, frames included in a video captured with the network camera 300 and outputs the frames to the controller 220. The network camera 300 may be, for example, a thermal camera instead of an optical camera.

The controller 220 includes, for example, a central processing unit (CPU), a random-access memory (RAM), and a read-only memory (ROM). The controller 220 controls each unit in the PC 200 and performs various information processes.

The moving object information obtainer 221 generates, as stationary data, time series data indicating movement of a moving object in a time series within a view angle of the network camera 300, and stores the generated stationary data into the storage 230. The inter-frame difference calculator 222 in the moving object information obtainer 221 calculates a pixel difference between two or more adjacent frames in the stationary data. The movement information calculator 223 in the moving object information obtainer 221 calculates the movement amount and the movement direction of the moving object based on the pixel difference calculated by the inter-frame difference calculator 222.

The reference value calculator 224 calculates a range determined by an average, a mode, a median, a minimum, or a maximum of the movement amount of the moving object based on the movement amount and the movement direction of the moving object calculated by the movement information calculator 223 and the movement amount and the movement direction indicated by the stationary data accumulated in the storage 230. The reference value calculator 224 also calculates a range determined by an average, a mode, a median, a minimum, or a maximum based on an angle of the movement direction of the moving object. The reference value calculator 224 updates the stationary data stored in the storage 230 using the calculation result.

The comparator 225 compares a difference between the calculated movement amount of the moving object and the movement amount of the moving object included in the stationary data with a threshold for determining an abnormality, and compares the difference between the calculated movement direction of the moving object and the movement direction of the moving object included in the stationary data with a threshold for determining an abnormality. The determiner 226 determines a moving object showing abnormal movement based on the results of comparison performed by the comparator 225.

In addition to the above stationary data, the storage 230 stores a program to be executed by the controller 220 and various sets of data used by the controller 220. For example, the storage 230 is an auxiliary storage device such as a hard disk drive or a solid state drive. The output unit 240 outputs, to the display 400, a notification of the result of determination performed by the determiner 226 about a moving object showing abnormal movement. The determination result about the moving object obtained by the determiner 226 may be stored into the storage 230 and may be output as appropriate from the output unit 240 to the display 400.

Figure 3:
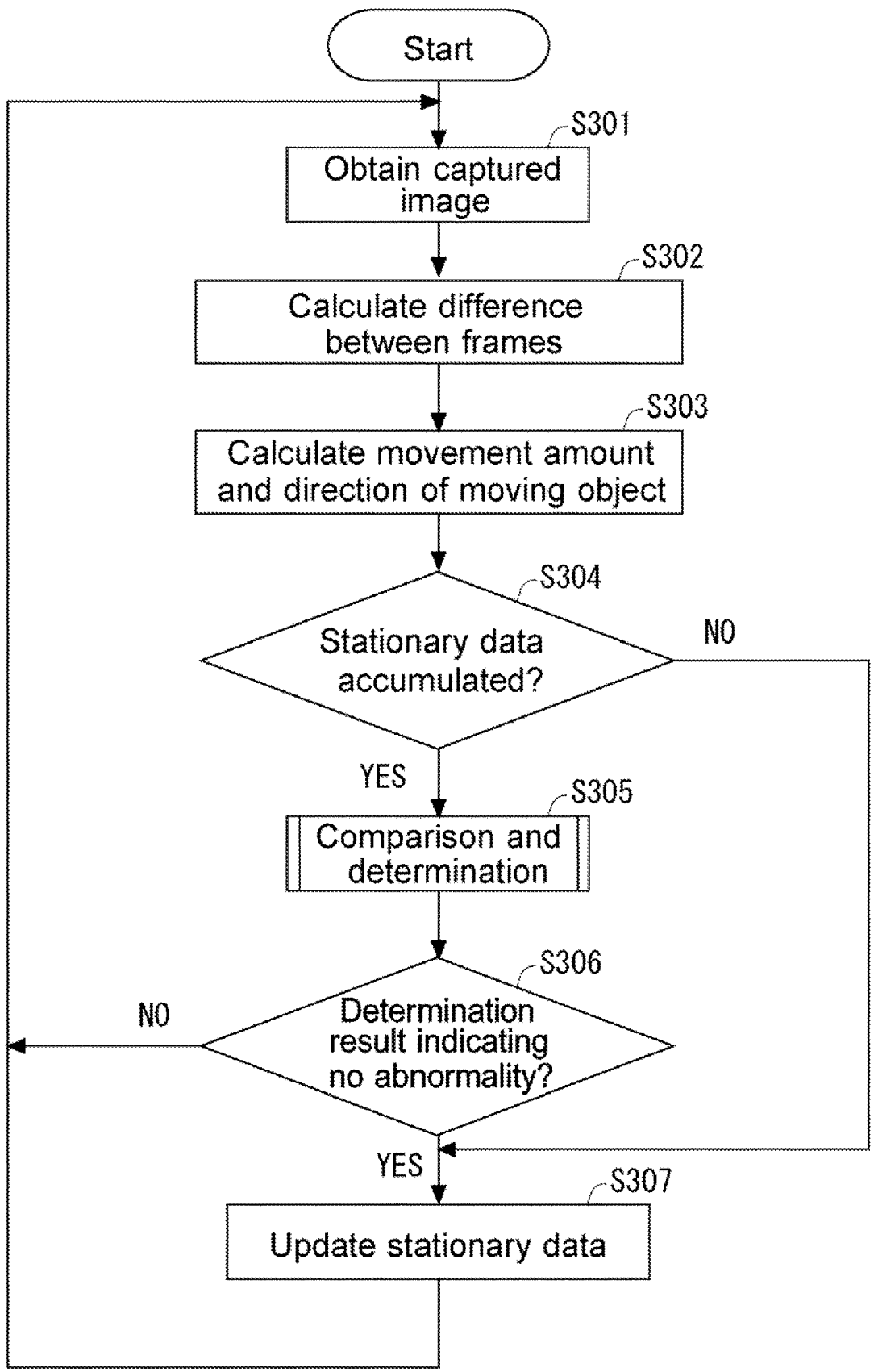
FIG. 3 is a flowchart of an example process performed by the PC according to the embodiment.

FIG. 3 is a flowchart of an example process performed by the PC 200. The PC 200 performs the process shown in FIG. 3 for each image obtained by the input unit 210. The process shown in FIG. 3 may be repeated by the PC 200 in any cycles, but is repeated in the present embodiment at a frame rate used in capturing images with the network camera 300.

The input unit 210 first obtains an image captured with the network camera 300 from the network camera 300 (step S301). The captured image obtained by the input unit 210 is temporarily stored into, for example, the RAM in the PC 200. When the input unit 210 has obtained the captured image of one frame alone, the input unit 210 repeats the processing in step S301 to obtain captured images of multiple frames to be used in the process described below.

The inter-frame difference calculator 222 in the moving object information obtainer 221 then calculates a difference in pixel value between a captured image of a current (latest) frame and a captured image of a preceding frame among the captured images of the multiple frames obtained by the input unit 210 (step S302). Although any number of frames may be used to calculate the difference, a difference between the captured images of three or more frames may be calculated by separately calculating absolute values of the difference in pixel value between two adjacent frames and calculating an average difference as the difference in pixel value.

The difference in pixel value between the frames calculated by the inter-frame difference calculator 222 is temporarily stored into, for example, the RAM in the PC 200. The inter-frame difference calculator 222 calculates the movement amount of the moving object with the processing described below. When differences in pixel value between three frames (e.g., differences in pixel between the current image and the preceding frame and between the current frame and the subsequent frame) are yet to be calculated, the processing in steps S301 and S302 is repeated to calculate the differences in pixel value between these frames.

The movement information calculator 223 then calculates the movement amount and the movement direction of the moving object in the captured image based on the difference in pixel value between multiple frames calculated in step S302 (step S303). A scalar value obtained from the difference in pixel value can be used as an example of the movement amount. An angle can be used as an example of the movement direction. The moving object in the captured image may be identified with a known technique, and the movement amount and the movement direction can be calculated with a known technique. These processes with known techniques will not be described in detail.

Figures 5A, 5B:
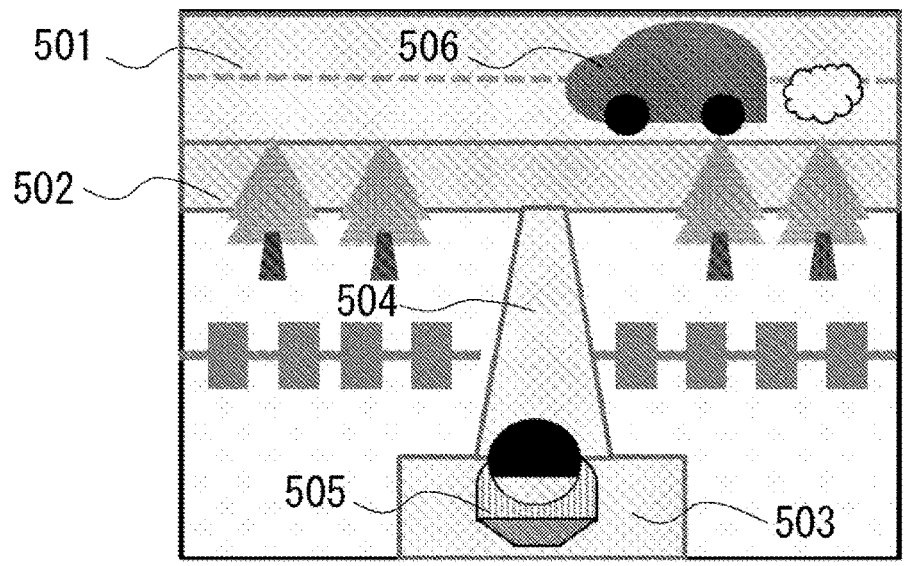

FIG. 5A is a schematic diagram of an example image captured with the network camera 300. As shown in FIG. 5A, the network camera 300 captures images of, for example, a road 501 and a sidewalk 502 facing a house, an approach 504 extending from the sidewalk 502 to an entrance 503 in the house, a person 505 standing at the entrance 503 in the house, and a car 506 traveling on the road 501.

Figure 5C:
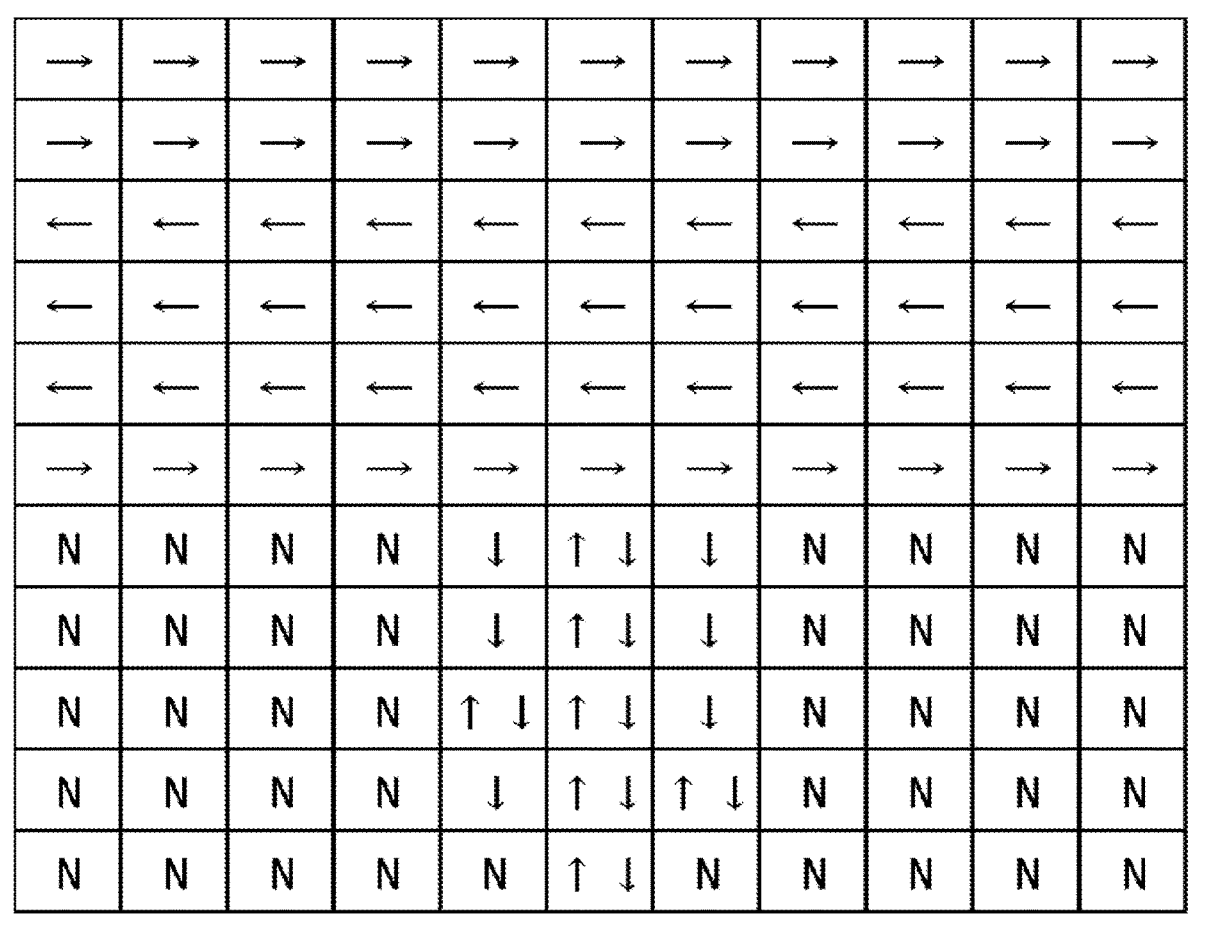

FIGS. 5B and 5C are schematic diagrams of example stationary data to be accumulated in the present embodiment. FIG. 5B shows stationary data indicating the movement amount of the moving object in the captured image. FIG. 5C shows stationary data indicating the movement direction of the moving object in the captured image. The stationary data indicates an average movement amount and an average movement direction of the moving object for each pixel block in the image captured with the network camera 300. Each pixel block may include any number of pixels selected from one to multiple pixels.

The stationary data indicating the movement amount includes a value indicating the movement amount stored for each pixel block in accordance with the moving speed of the moving object. For the road 501 on which a car travels, for example, the stationary data includes a greater value indicating the movement amount for each block. For the sidewalk 502 and the approach 504 on which a person walks, the stationary data includes a less value indicating the movement amount for each block than for the road 501 and a greater value than for surrounding other blocks.

The stationary data indicating the movement direction includes a representative movement direction indicating the movement direction of the moving object. For the road 501 on which a car travels in a fixed direction, the movement directions of the corresponding blocks in the captured image in FIG. 5A are indicated by arrows indicating either the right or left direction aligned horizontally. For the approach 504 on which a person moves between the sidewalk 502 and the entrance 503, the movement directions of the corresponding blocks are indicated by arrows indicating the vertical direction. For still portions of the captured image with no movement of the moving object, no arrows are shown to indicate the movement directions of the corresponding blocks (N in FIG. 5C).

Referring back to the flowchart in FIG. 3, the controller 220 determines whether the stationary data has been accumulated in the storage 230 in step S304. The controller 220 can determine whether the stationary data has been accumulated using, for example, the data amount of the stationary data, the count of updates, and a flag indicating that stationary data has been accumulated. When the controller 220 determines that the stationary data has been accumulated (S304: Yes), the processing advances to step S305. When the controller 220 determines that the stationary data has not been accumulated (S304: No), the processing advances to step S307.

A subroutine process in step S305 will now be described with reference to FIG. 4. In step S401, the comparator 225 first compares the movement amount and the movement direction of the moving object calculated in step S303 with the movement amount and the movement direction indicated by the stationary data stored in the storage 230 to calculate deviations of the movement amount and the movement direction of the moving object calculated in step S303 from the stationary data.

In step S402, the comparator 225 then determines whether the deviations of the movement amount and the movement direction of the moving object calculated in step S305 are greater than the respective thresholds. When the comparator 225 determines that either the deviation of the movement amount or the deviation of the movement direction of the moving object is greater than the threshold (S305: Yes), the processing advances to step S405. When the comparator 225 determines that both the deviation of the movement amount and the deviation of the movement direction of the moving object are less than or equal to the thresholds (S305: No), the processing advances to step S405.

In step S403, the comparator 225 notifies the user of the moving object having either the deviation of the movement amount or the deviation of the movement direction determined greater than the threshold in step S402 as the moving object showing abnormal movement. For this notification to the user, the comparator 225 may display, through the output unit 240, an image showing the moving object in the captured image or a message prompting the user to determine whether the moving object on the display 400 is a moving object showing abnormal movement. The comparator 225 may also use another manner of notification, such as voice notification, to notify the user of the moving object.

Figure 6A:
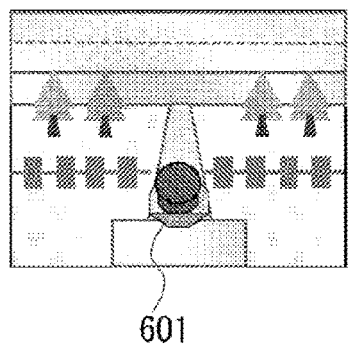
FIGS. 6A to 6C are schematic diagrams each describing movement of a suspicious person in a captured image in a specific example of the embodiment.
Figure 6B:
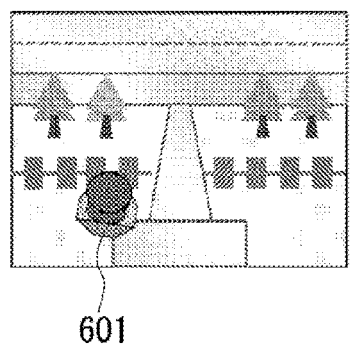
Figure 6C:
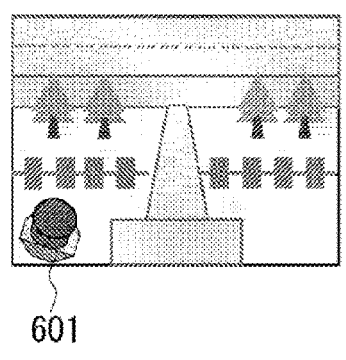

The relationship between the captured images of the moving object showing abnormal movement and the movement amount and the movement direction obtained through the above processes will now be described with reference to FIGS. 6A to 6E. FIGS. 6A to 6C show example images captured with the network camera 300 arranged in a time series (time t−1, t, and t+1). In this example, a suspicious person 601 approaches a house in which the network camera 300 is installed. For each image captured with the network camera 300, the movement amount of a pixel block overlapping an image including the moving suspicious person 601 is calculated to be a greater value than the value for the movement amount of a pixel block in the other area through the above processes in steps S302 and S303. FIG. 6D shows an example movement amount calculated in this example. The movement amount for the block in the shaded area in FIG. 6D is the movement amount for the pixel block overlapping the area including the suspicious person 601 who has moved in the image. Through the above processing in steps S302 and S303, the movement direction is calculated as in FIG. 6E for the pixel block overlapping the area including the suspicious person 601 who has moved in the image.

Figure 6E:
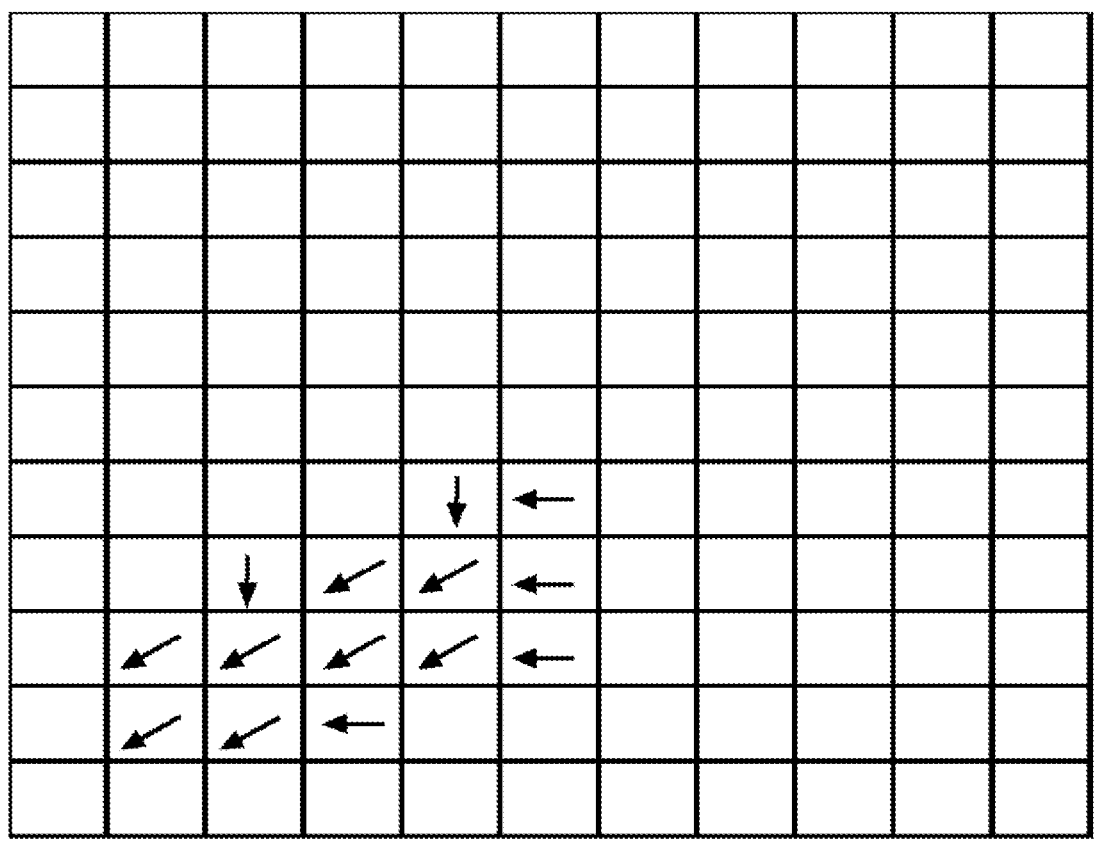

The deviation between the calculated movement amount in FIG. 6D and the movement amount in FIG. 5B of the stationary data is obtained, and the deviation between the calculated movement direction in FIG. 6E and the movement direction in FIG. 5C of the stationary data is obtained. This allows determination of the block having the deviation from the movement amount in the stationary data greater than the threshold and the block having the deviation from the movement direction in the stationary data greater than the threshold to be the block including the moving object showing abnormal movement. Different thresholds may be used for each block as the thresholds for the movement amount and the movement direction. The thresholds may be set to appropriate values.

As described above, the structure according to the present embodiment can notify the user of a moving object showing abnormal movement in an image based on the movement amount and the movement direction accumulated based on images captured with the network camera. This structure eliminates the use of large-volume dictionary data to determine a moving object showing abnormal movement and eliminates image processing such as comparison using such dictionary data unlike with known techniques, and can detect a moving object showing abnormal movement with less image processing.

In step S403, the user determines whether the moving object is a moving object showing abnormal movement based on, for example, the moving object or a message displayed on the display 400, and inputs the determination result into the PC 200 by operating an input device such as a mouse, a keyboard, or a microphone (not shown).

In step S404, the determiner 226, which serves as a receiver for a user input, receives the determination result for the moving object input from the user in step S403. In response to a user input indicating that the moving object is a moving object showing abnormal movement (with abnormality) (Yes in S404), the processing advances to step S405. In response to a user input indicating that the moving object is not a moving object showing abnormal movement (with no abnormality) (No in S404), the processing advances to step S406.

In step S405, the determiner 226 stores, into the storage 230, the determination result indicating that the moving object is the object showing abnormal movement, and ends this subroutine. In step S406, the determiner 226 stores, into the storage 230, the determination result indicating that the moving object is not the object showing abnormal movement, and ends this subroutine.

In step S306 of FIG. 3, the controller 220 determines whether the determination result obtained by the determiner 226 for the moving object with the movement amount and the movement direction calculated in step S303 indicates no abnormality. In response to the determination result obtained by the determiner 226 indicating no abnormality (Yes in S306), the controller 220 advances the processing to step S307. In response to the determination result obtained by the determiner 226 indicating abnormality (No in S306), the controller 220 returns the processing to step S301. In step S307, the controller 220 selects the modes of the movement amount and the movement direction of each pixel from a data group combining data about the movement amount and the movement direction calculated in step S303 and the stationary data stored in the storage 230, and updates the stationary data with the selected modes. The controller 220 stores the updated stationary data into the storage 230.

In the present embodiment, the stationary data is updated simply based on the determination that the moving object is not a moving object showing abnormal movement in the captured image through the processing in steps S306 and S307. This allows data about a moving object without showing abnormal movement is accumulated as the stationary data. For any incorrect determination about abnormal movement performed by the PC 200 through the processing in steps S403 to S406, the stationary data is updated to show no abnormality in the movement of the moving object based on feedback with a user input. In the present embodiment as described above, the stationary data includes data with highly reliable determination criteria.

The image processing apparatus according to the present embodiment allows accumulation of stationary data for detecting moving objects showing abnormal movement based on captured images input from the camera. The image processing apparatus according to the present embodiment can have less processing load for moving object detection than when large-volume dictionary data is prepared and used in various use environments with a known technique.

Others

The embodiment described above is a mere example of the present invention. The present invention is not limited to the embodiment described above, but may be modified variously within the scope of the technical ideas of the invention. For example, the components and the processes in the above embodiment may be combined with each other. In the above embodiment, the movement amount and the movement direction of a moving object are used as the movement information about the moving object. In some embodiments, at least one of the movement amount or the movement direction may be used as the movement information. When the movement amount of a moving object is used, for example, the movement of a moving object into an area that is not normally to be entered (e.g., into a restricted area) can be detected. When the movement direction of the moving object is used, the movement of a moving object in a direction different from usual (e.g., a person or car moving in the opposite direction) can be detected. When both the movement amount and the movement direction of the moving object are used, the movement of a moving object showing unusual behavior (e.g., prowling) can be detected.

In the determination in step S402 in the above embodiment, a notification about a moving object showing abnormal movement is provided to the user when either the deviation of the movement amount or the deviation of the movement direction is greater than the threshold. In some embodiments, such a notification may be provided to the user when both the deviation of the movement amount and the deviation of the movement direction are greater than the respective thresholds. In the above embodiment, the processing in steps S403 and S404 may be eliminated. The determination as to whether the moving object is a moving object showing abnormal movement may be performed in steps S405 and S406 based on the determination result in step S402.

In the above embodiment, known human body detection and general object recognition may be combined with the detection of moving objects in the captured images to narrow the monitoring target in captured images to persons and objects alone. This excludes movement of moving objects unrelated to a monitoring target, such as swaying trees in captured images, and thus improves the accuracy of detecting moving objects showing abnormal movement.

Appendix 1

An image processing apparatus, comprising:
an image obtainer (210) configured to obtain captured images captured with a camera in a time series;
an accumulator (230) configured to accumulate movement information about a moving object in the captured images in the time series;
a calculator (222) configured to calculate movement information about the moving object based on the captured images in the time series obtained by the image obtainer;
a comparator (225) configured to compare the movement information about the moving object calculated by the calculator with the movement information about the moving object accumulated by the accumulator;
a determiner (226) configured to determine, based on a result of comparison of the movement information about the moving object performed by the comparator, whether the moving object being a target for the comparison performed by the comparator shows abnormal movement; and
an output unit (240) configured to output a result of determination performed by the determiner.

Appendix 2

An image processing method, comprising:
obtaining (S301) captured images captured with a camera in a time series;
accumulating (S304, S307) movement information about a moving object in the captured images in the time series;
calculating (S303) movement information about the moving object based on the obtained captured images in the time series;
comparing (S305) the calculated movement information about the moving object with the accumulated movement information about the moving object;
determining (S402), based on a result of comparison of the movement information about the moving object, whether the moving object being a target for the comparison shows abnormal movement; and
outputting (S403) a result of determination.

REFERENCE SIGNS LIST

100: Image processing apparatus
101: Image obtainer
102: Abnormality determiner
103: Output unit
200: PC (image processing device)
210: Input unit
220: Controller
222: Inter-frame difference calculator
223: movement information calculator
225: Comparator
226: Determiner
230: Storage
240: Output unit

The invention claimed is:
1. An image processing apparatus, comprising:
a memory configured to store computer-executable instructions and a processor configured to execute the computer-executable instructions stored in the memory that cause the image processing apparatus to perform operations comprising:
obtaining captured images captured with a camera in a time series;
obtaining first movement information about a moving object in the captured images in the time series;

accumulating the first movement information in a storage;
calculating second movement information about the moving object based on the captured images in the time series;
comparing the second movement information with the first movement information accumulated in the storage;
determining, based on a result of comparison of the first movement information and the second movement information, whether the moving object being a target for the comparison shows abnormal movement;
outputting a result of determination;
receiving user input information for the result of determination;
determining, in accordance with the user input information, whether to update the first movement information accumulated in the storage; and
updating the first movement information accumulated in the storage using the second movement information when the user input information includes information indicating that the moving object does not show the abnormal movement,
wherein the first movement information accumulated in the storage is not updated when user input information includes information indicating that the moving object shows the abnormal movement.

2. The image processing apparatus according to claim 1, wherein
the first movement information and second movement information include at least one of a movement amount of the moving object or a movement direction of the moving object.

3. The image processing apparatus according to claim 2, wherein
the at least one of the movement amount or the movement direction is calculated based on a difference in pixel value between captured images obtained in the time series.

4. The image processing apparatus according to claim 2, wherein
for the first movement information including the movement amount of the moving object, a range determined by one of an average, a mode, a median, a minimum, or a maximum of the movement amount is accumulated in the storage.

5. An image processing method, comprising:
obtaining captured images captured with a camera in a time series;
obtaining first movement information about a moving object in the captured images in the time series;
accumulating the first movement information in a storage;
calculating second movement information about the moving object based on the obtained captured images in the time series;
comparing the second movement information with the first movement information accumulated in the storage;
determining, based on a result of comparison of the first movement information and the second movement information, whether the moving object being a target for the comparison shows abnormal movement; and
outputting a result of determination;
receiving user input information for the result of determination;
determining, in accordance with the user input information, whether to update the first movement information accumulated in the storage; and
updating the first movement information accumulated in the storage using the second movement information when the user input information includes information indicating that the moving object does not show the abnormal movement,
wherein the first movement information accumulated in the storage is not updated when user input information includes information indicating that the moving object shows the abnormal movement.

6. A non-transitory computer readable medium storing a program for causing a computer to perform a process, comprising:
obtaining captured images captured with a camera in a time series;
obtaining first movement information about a moving object in the captured images in the time series;
accumulating the first movement information in a storage;
calculating second movement information about the moving object based on the obtained captured images in the time series;
comparing the second movement information with the first movement information accumulated in the storage;
determining, based on a result of comparison of the first movement information and the second movement information, whether the moving object being a target for the comparison shows abnormal movement; and
outputting a result of determination;
receiving user input information for the result of determination;
determining, in accordance with the user input information, whether to update the first movement information accumulated in the storage; and
updating the first movement information accumulated in the storage using the second movement information when the user input information includes information indicating that the moving object does not show the abnormal movement,
wherein the first movement information accumulated in the storage is not updated when user input information includes information indicating that the moving object shows the abnormal movement.

* * * * *